large>(12) United States Patent
Cooper

(10) Patent No.: US 7,986,842 B2
(45) Date of Patent: Jul. 26, 2011

(54) COLLECTIVE MEDIA ANNOTATION USING UNDIRECTED RANDOM FIELD MODELS

(75) Inventor: Matthew L. Cooper, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 929 days.

(21) Appl. No.: 11/558,826

(22) Filed: Nov. 10, 2006

(65) Prior Publication Data

US 2008/0112625 A1    May 15, 2008

(51) Int. Cl.
*G06K 9/62* (2006.01)
(52) U.S. Cl. ........................................ 382/228; 382/173
(58) Field of Classification Search .................. 382/275, 382/228, 299, 289
See application file for complete search history.

(56) References Cited

U.S. PATENT DOCUMENTS 6,516,090 B1 *  2/2003  Lennon et al. ................ 382/173

OTHER PUBLICATIONS

Kumar et al: "Discriminative random fielsd: a discriminative framework for contextual interaction in classification", IEEE, ICCV, 2003.*
Tekinalp: "Detecting and recognizing text from video frames", Middle East Technical University, the thesis for master degree, 2002.*
Berry et al., "Using Linear Algebra for Intelligent Information Retrieval," SIAM Review, pp. 1-24 (Dec. 1994).
Ghamrawi and McCallum, "Collective Multi-Label Classification," Proc. of the 14th ACM International Conference on Information and Knowledge Management, CIKM '05, ACM Press, 7 pages (2005).
Hauptmann, "Towards a Large Scale Concept Ontology for Broadcast Video," In Proc. of the 3rd Int'l Conf. On Image and Video Retrieval, CIVR 2004. LNCS 3115. Springer-Verlag, Berlin, pp. 674-675 (2004).
Hollink et al., "Building a Visual Ontology for Video Retrieval," In Multimedia '05: Proceedings of the 13th Annual ACM International Conference on Multimedia, ACM Press, 4 pages (2005).
Jeon et al., "Automatic Image Annotation and Retrieval Using Cross-Media Relevance Models,". Proceedings of the 26th Annual international ACM SIGIR Conference on Research and Development in Information Retrieval, ACM Press, 8 pages (2003).
Kumar et al., "Discriminative Fields for Modeling Spatial Dependencies in Natural Images," Advances in Neural Information Processing Systems, NIPS, 8 pages (2004).
Lafferty et al., "Conditional Random Fields: Probabilistic Models for Segmenting and Labeling Sequence Data," Proc. of the 18th International Conference on Machine Learning, p. 262-289 (2001).

(Continued)

*Primary Examiner* — Samir Ahmed
*Assistant Examiner* — Ruiping Li
(74) *Attorney, Agent, or Firm* — Fliesler Meyer LLP

(57) ABSTRACT

In an embodiment, the present invention relates to a method for semantic analysis of digital multimedia. In an embodiment of the invention, low level features are extracted representative of one or more concepts. A discriminative classifier is trained using these low level features. A collective annotation model is built based on the discriminative classifiers. In various embodiments of the invention, the frame work is totally generic and can be applied with any number of low-level features or discriminative classifiers. Further, the analysis makes no domain specific assumptions, and can be applied to activity analysis or other scenarios without modification. The framework admits the inclusion of a broad class of potential functions, hence enabling multi-modal analysis and the fusion of heterogeneous information sources.

19 Claims, 6 Drawing Sheets

OTHER PUBLICATIONS

Malouf "A Comparison of Algorithms for Maximum Entropy Parameter Estimation," Proc. of the 6$^{th}$ Conference on Natural Language Learning—vol. 20 International Conference on Computational Linguistics, Association for Computational Linguistics, 7 pages (2002).

Over et al., "TRECVID 2005—An Overview," Proc. TRECVID 2005, http://www-nlpir.nist.gov/projects/tvpubs/tv5.papers/tv5overview.pdf, 27 pages (Mar. 27, 2006).

Platt, "Probabilistic Outputs for Support Vector Machines and Comparisons to Regularized Likelihood Methods," Advances in Large Margin Classifiers, Smola, ed., MIT Press, 14 pages, (Mar. 26, 1999).

Snoek et al., "Early Versus Late Fusion in Semantic Video Analysis," Proc. of the 13th Annual ACM International Conference on Multimedia, ACM Press, Singapore, 4 pages (Nov. 6-11, 2005).

Snoek et al., "The Challenge Problem for Automated Detection of 101 Semantic Concepts in Multimedia," Proc. of ACM Multimedia, Santa Barbara, CA, 10 pages (Oct. 23-27, 2006).

van Gemert et al., "Robust Scene Categorization by Learning Image Statistics in Context," Proc. of IEEE CVPR, pp. 1-8 (2006).

Yan et al., "Mining Relationships Between Concepts Using Probabalistic Graphical Models." Proc. IEEE ICME, Toronto, Canada, 4 pages. (Jul. 9-12, 2006).

Kumar, "Models for Learning Spatial Interactions in Natural Images for Context-Based Classification," Ph.D. Thesis, The Robotics Institute, School of Computer Science, Carnegie Mellon University, Pittsburgh, PA, 191 pages, (2005).

\* cited by examiner

COLLECTIVE MEDIA ANNOTATION USING UNDIRECTED RANDOM FIELD MODELS

BACKGROUND OF THE INVENTION

1. Field of the Invention

The present invention relates to a method for automatic annotation of digital media.

2. Description of Related Art

Substantial current multimedia analysis research focuses on information retrieval for video content. Companies such as Yahoo! and Google are extending their text-based search capabilities to video data. The applicability of these systems for content indexing is often limited to video with available time-aligned text, or relies on the link structure and text of web pages containing the videos. Video retrieval has also been the focus of the highly successful TRECVID workshops (P. Over, T. Ianeva, W. Kraaij, A. Smeaton, TRECVID 2005, "An Overview", *Proc. TRECVID* 2005, http://www.n-lpir.nist.gove/projects/tvpubs/tv5.papers/tv5overview.pdf last visited Nov. 1, 2006). In the TRECVID evaluations, the use of visual information is emphasized, however extracting semantics from visual data in the absence of textual descriptors remains a major open problem.

Recent work to address this semantic gap has been concentrated on ontology-based approaches to semantic feature extraction. (A. Hauptmann. Towards a large scale concept ontology for broadcast video, in *Proc. Of the Third Conf. on Image and Video Retrieval*, ser. Lecture Notes in Computer Science, vol. 3115. Springer, pp. 674-675, 2004 and L. Hollink, M. Worring, and G. Schreiber, Building a visual ontology for video retrieval in *MULTIMEDIA '05: Proceedings of the 13th annual ACM international conference on Multimedia*. ACM Press, 2005). In the ontology-based approaches, a "basis" set of binary classifiers are built to determine if a video shot exhibits a specific semantic feature. These classification outputs are combined statistically to provide higher-level analysis and enhance indexing and retrieval. Many of these approaches operate at the shot-level following an initial segmentation. This is desirable for computational efficiency, dynamic analysis of local sets of frames, and for extraction of semantic features that exhibit some temporal duration.

Manual tags are now proliferating on various shared video and image data sites such as Flickr and You Tube. While this information is of tremendous value for video indexing, including for refining and training automatic systems, it also exhibits a number of shortcomings. For example, lengthy videos can have tags that apply only to a small (sometimes unidentified) portion of the video. Also, the classic problems of polysemy and synonymy described in the text categorization context are inherited in aggregating tag data for multimedia categorization (M. W. Berry, S. T. Dumais, and G. W. O'Brien, "Using linear algebra for intelligent information retrieval", *SIAM Review* 37(4):573-595, 1995).

SUMMARY OF THE INVENTION

The goal to detect semantic attributes or concepts in clips of video via analysis of a single keyframe or set of frames. The proposed methods integrate high performance discriminative single concept detectors in a random field model for collective multiple concept detection. Furthermore, a generic framework is provided for semantic media classification capable of capturing arbitrary complex dependencies between the semantic concepts.

Although, the system described herein have been tested with video frames, the system is broadly applicable to other types of multimedia content.

In an embodiment of the invention, semi-automatic interfaces for identifying concepts are enabled. For example, given a collection of photos or videos, the invention can recommend a set of concepts as a rank list for a user to select from. This list could come from other users' tags, or a pre-existing collection of tagged data. In aggregating tagged data (e.g. Flickr), the invention can help cluster similar tags or help resolve ambiguities in the tags (e.g., polysemy).

The problem addressed here is the automatic annotation of segmented video using a set of binary attributes. These attributes are referred to as concepts, and the more general problem as concept detection. The system is able to detect the presence/absence of a set of concepts by exploiting concept interdependence.

In an embodiment of the invention, a method of identifying concept(s) in digital multimedia includes extracting low level features representative of the one or more concept which are used to train a discriminative classifier for each concept, where the discriminative classifier(s) are combined to build a collective annotation model. Further, a set of interaction potentials is defined to identify related concepts in the multimedia. Using the collective annotation model and the interaction potentials the concept(s) can be identified.

This summary is not intended to be a complete description of, or limit the scope of, the invention. Alternative and additional features and aspects of the invention can be obtained from a review of the specification, the figures, and the claims.

BRIEF DESCRIPTION OF THE DRAWINGS

Preferred embodiments of the present invention will be described in detail based on the following figures, wherein.

DETAILED DESCRIPTION

Figure 1A:
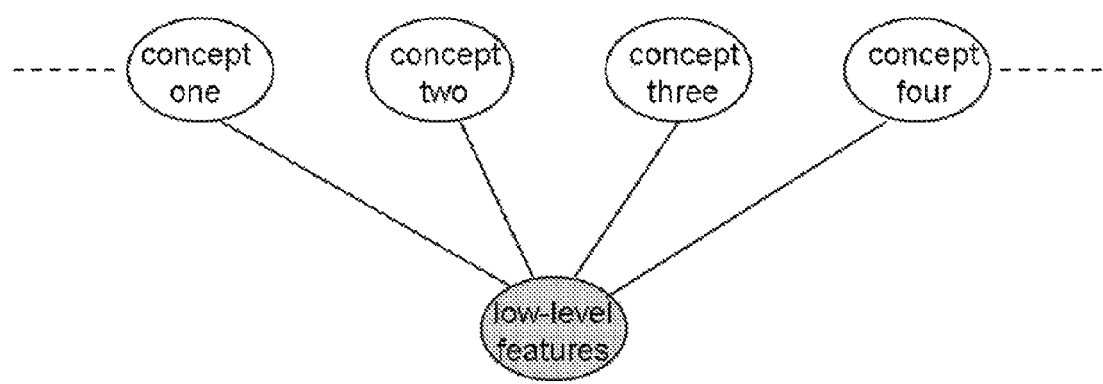
FIG. 1A shows an example of graphical models used for detecting four concepts where the model depicts independent classification.

To supply consistent and reliable annotations for indexing or metadata creation, a semiautomatic approach is required. Manual annotation is not feasible on the scale of legacy assets, let alone for the ever increasing amounts of newly produced content. Automatic techniques that are scalable can accommodate the quantity of the data, but the quality of automatic annotations is not sufficient. Several requirements can be identified for the analysis components of an ideal media annotation system:

the ability to integrate heterogeneous modalities in a common framework.

the ability to supply a confidence measure or ranking associated with annotations, where such measures can be time-varying.

a fully automatic mode for annotating either archival data, or data for which tag information, text transcripts, or web page link structure is absent.

a semi-automatic mode, for manually revising automatic results as needed, leveraging confidence measures.

the ability to reconcile or cluster tags used to denote similar concepts by different users, leveraging label rankings and co-occurrence.

Definitions

A 'tag' or an 'annotation' is used to describe text that is manually or otherwise associated with multimedia data though not generated with an embodiment of the invention. However, a tag or an annotation may be aggregated or reclassified with an embodiment of the invention.

A 'concept' is used to describe text associated with multimedia data that is semi-automatically or automatically generated with an embodiment of the invention.

A 'confidence measure' is derived from the probability of encountering a concept as specified by the model.

A 'ranking' is derived form the confidence measure.

2.1 Feature Extractions

In the first processing step, low-level feature data can be extracted. In our case, the source video is segmented according to shots, and keyframes are identified within each shot. The keyframes are processed to extract low-level feature data. This data may include visual features such as color histograms, texture or edge features, motion analysis or face detection output. If time-aligned text data is present, standard low-level text features such as word counts or tf/idf features can also be included. The specific set of features used is not critical. In the multi-modality case, early or late fusion approaches can be used to construct the single concept classifiers (C. Snoek, M. Worring, and A. W. Smeulders. Early versus late fusion in semantic video analysis. *Proceedings of the 13th Annual ACM international Conference on Multimedia*. ACM Press, New York, N.Y., 399-402, 2005).

2.2 Independent Concept Detection

In the second step, a discriminative classifier is trained for each concept using a labeled training act of low-level features. For some time, Support Vector Machines (SVM) have been the preferred classifer. The output of each SVM is transformed to a probability using a logistic mapping, and this provides a baseline system for independent concept detection.

In the experiments below, the publicly available low-level features (see J. van Gemert, J.-M. Geusebroek, C. Veenman, C. Snoek, and A. Smeulders. Robust Seene Categorization by Learning Image Statistics in Context. To appear, *Proceedings of IEEE CVPR,* 2006) and SVM outputs provided by the Media Mill team are utilized (C. Snoek, M. Worring, J. van Gemert, J.-M. Geusebroek, and A. Smeulders. "The Challenge Problem for Automated Detection of 101 Semantic Concepts in Multimedia", *Proceedings of ACM Multimedia,* 2006). These SVM outputs are highly optimized using a computationally intensive grid search for classification parameters on a per concept basis. As such, these outputs represent an extremely competitive baseline system that outperformed all of our systems submitted in the 2005 evaluation in the experiments below.

Figure 1B:
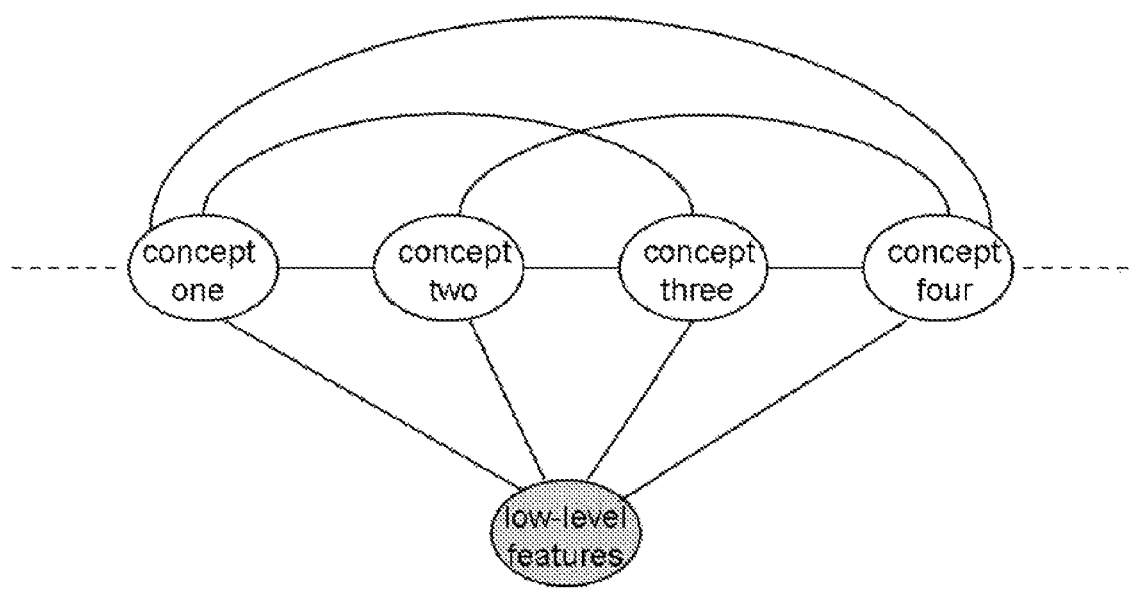
FIG. 1B shows an example of graphical models used for detecting four concepts where the model depicts collective classification.

The graphical model corresponding to this approach appears in FIG. 1A. Graphical models corresponding to the collective annotation methods presented herein appear in FIG. 1B. Probabilistically, if the $i^{th}$ concept in the concept set C is denoted by the binary random variable $Y_i$ then $$P(Y|X) = \prod_{i \in C} P(Y_i|X) \quad \text{equation (1)}$$

2.3 Modeling Concept Co-occurrence

A collective annotation model can be based on the single concept discriminative models described in the previous section. Our first approach extends the discriminative random field (DRF) model of Kumar and Hebert (S. Kumar and M. Hebert. It is noted, that the term "based on" as used herein, means "based at least in part on", unless otherwise specified. Discriminative Fields for Modeling Spatial Dependencies in Natural Images, *Advances in Neural Information Processing Systems, NIPS* 16, 2004). This model combines discriminative single concept classifiers with pairwise concept co-occurrence features representing contextual information. In their work, the goal is to perform binary classification of pixel blocks in images as either "natural" or "man-made." For the per-block classification, they use logistic regression. The random field incorporates spatial dependencies. More specifically, they model the probability of the (collective) vector of binary labels Y given the low-level image data X as $$P(Y|X) = \frac{1}{Z(X)} \exp\left[\sum_{i \in S} A_i(Y_i, X) + \sum_{i \in S} \sum_{j \in N_i} I_{ij}(Y_i, Y_j, X)\right] \quad \text{equation (2)}$$

The terms $A_i$ are the association potential (or unary or node potentials) which are local discriminative classifiers for each spatial location i in the set S. $I_{ij}$ is the term representing the interaction between the spatial locations, i, j. $N_i$ is the set of neighbors of not i in the graph.

This approach can be adapted to collective semantic concept detection. Rather than collectively classify adjacent spatial locations in a still image, related semantic concepts in a video clip can be collectively detected. Specifically, the SVM classifiers trained independently for each concept can be used for the association terms in equation (2). Each SVM output can be mapped to the corresponding probability $P_D(Y_i=1|X)$ (see J. Platt, "Probabilistic Outputs for Support Vector Machines and Comparisons to Regularized Likelihood Methods", in *Advances in Large Margin Classifiers*, A. Smola, P. Bartlett, B. Scholkopf, D. Schuurmans, Eds. MIT Press, 1999). The subscript D can be used to associate this probability with the single concept classifiers in contract to the collective models presented below. The association term for concept $Y_i$ can be set according to equation (3).

$$A_i(Y_i,X) = v_i \log(P_D(Y_i=1|X)) \quad \text{equation (3)}$$

In the absence of interaction terms (i.e., $I_{ij}$=0), equation (2) reverts to the per-concept SVM models. The scalar weights $v_i$ are determined in training as described below.

Concepts which are related can be identified next, i.e. which concepts are connected by an edge in our graph. For this, a chi-squared test using the ground truth labeling of our training set can be used. Each concept can be connected to the five other concepts to which it has the most statistically significant relationships. The resulting graph defines the neighborhoods $N_i$ for each concept $Y_i$. This is currently done without thresholding and may not be optimal. However, learning optimal graphs in the general case is NP-hard. Nonetheless, evaluating other heuristics and approximation schemes for graph induction is both critical to the success of these methods and a promising area for future work. Many other approaches can be used in this step without limiting the invention.

The interaction potential of Kumar and Herbert were inspired by longstanding work in image analysis using Markov random fields (S. Kumar and M. Hebert. Discriminative Fields for Modeling Spatial Dependencies in Natural Images. *Advances in Neural Information Processing Systems, NIPS* 16, 2004). In contrast, the interaction potentials used are defined building on recent work in text categorization (N. Ghamrawi, and A. McCallum, "Collective multi-label classification", *Proceedings of the* 14*th ACM international Conference on information and Knowledge Management CIKM* '05, ACM Press, New York. N.Y., pp. 195-200, 2005). Equation (2) can be rewritten to clarify our notation as equation (4).

$$P(Y|X) = \frac{1}{Z(X)} \exp\left[\sum_{i \in S} v_i \log(P_D(Y_i, X)) + \sum_{i \in S} \sum_{j \in N_i} \sum_{k \in K_i} \lambda_{ij}^k f_{ij}^k(Y_i, Y_j, X)\right]$$ equation (4)

The notation $P_D$ can be used to distinguish the probability mapped from the single concept SVM output from the corresponding marginal probability of the joint model. Comparing equation (4) to equation (2), it is noted that the interaction term is the linear form:

$$I(Y_i, Y_j, X) = \sum_{k \in K} \lambda_{ij}^k f_{ij}^k(Y_i, Y_j, X) = A_{ij}^T F_{ij}(Y_i, Y_j, X)$$ equation (5)

It is noted that equation (4) can be rewritten compactly using vectors as equation (6).

$$P(Y|X) = \frac{1}{Z(X)} \exp\left[V^T P_D(X) + \sum_{i \in C} \sum_{j \in N_i} A_{ij}^T F_{ij}(Y_i, Y_j, X)\right]$$ equation (6)

In equation (6), the $i^{th}$ elements of V and $P_D(X)$ are $v_i$ and $\log(P(Y_i|X))$, respectively. Likewise, the $k^{th}$ elements of $A_{ij}$ and $F_{ij}(Y_i, Y_j, X)$ are $v_{ij}^{(k)}$ and $f_{ij}^{(k)}(Y_i, Y_j, X)$, respectively. This form shows that the random field model is simple a log-linear classifier. For maximum likelihood model training, the gradients of the log-likelihood thus take a standard form.

2.3.1 The 'CML+1' Model

The details of the interaction potential functions for two models are as follows. The first model, denoted 'CML+1', captures inter-concept co-occurrence. These features are defined for each pair of concepts $Y_i, Y_j$ that are connected in our graph (i.e. not for all pairs). Thus, the indexed family of interaction potential functions is given by equations (7A)-(7D).

$$f_{ij}^{(0)}(Y_i, Y_j, X) = \begin{cases} 1 & Y_i = Y_j = 0 \\ 0 & \text{otherwise} \end{cases}$$ equation (7A)

$$f_{ij}^{(1)}(Y_i, Y_j, X) = \begin{cases} 1 & Y_i = 1, Y_j = 0 \\ 0 & \text{otherwise} \end{cases}$$ equation (7B)

$$f_{ij}^{(2)}(Y_i, Y_j, X) = \begin{cases} 1 & Y_i = 0, Y_j = 1 \\ 0 & \text{otherwise} \end{cases}$$ equation (7C)

$$f_{ij}^{(3)}(Y_i, Y_j, X) = \begin{cases} 1 & Y_i = Y_j = 1 \\ 0 & \text{otherwise} \end{cases}$$ equation (7D)

By modeling the four possible combinations separately, all types of inter-concept co-occurrence within the model can be captured. For this model the index set for the interaction potentials is simply $\kappa=\{0, 1, 2, 3\}$. This interaction model adds discriminatively trained association potentials to a previously proposed method for text categorization (see N. Ghamrawi, and A. McCallum. Collective multi-label classification. *Proceedings of the* 14*th ACM international Conference on information and Knowledge Management CIKM* '05. ACM Press, New York, N.Y., pp. 195-200, 2005).

Figure 3:
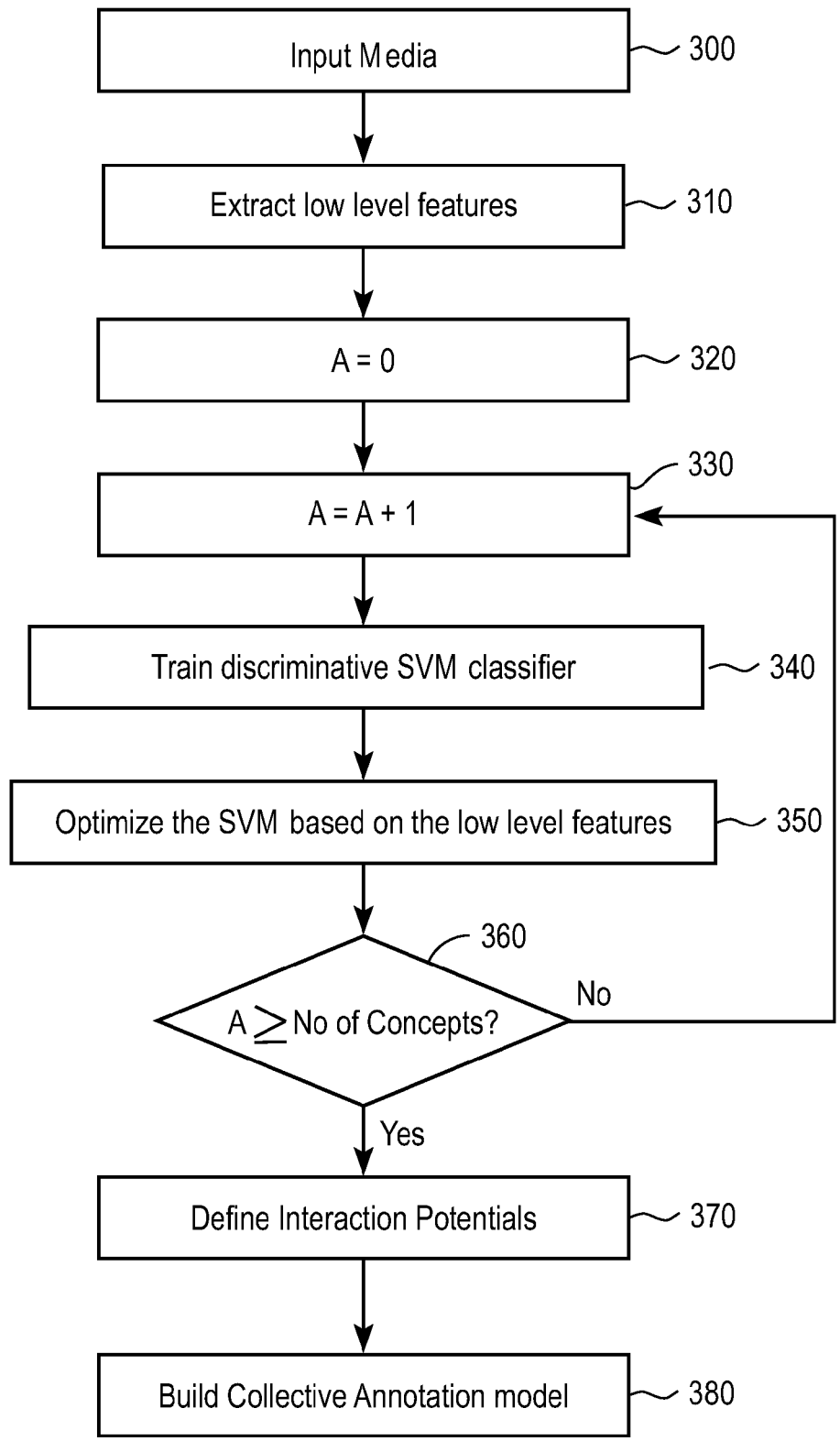
FIG. 3 illustrates a block diagram for training the semantic analysis model to determine whether the concept(s) are present on a labeled set of media in accordance with the present invention.

As shown in FIG. 3, in an embodiment of the invention the SVM's are trained as to whether a concept is present using a labeled set of media, the media are input at step 300. Next, the low level features are extracted at step 310. At step 320 the initial conditions are set. At step the initial conditions are incremented. At step 340 the discriminative classifier is trained with the set of low level features. At step 350 the SVM's are optimized based on the low level features. At step 360 the procedures iterated until the SVM's have been trained for all concepts. At step 370 interaction potentials are defined. At step 380 a collective annotation model is built.

Figure 4:
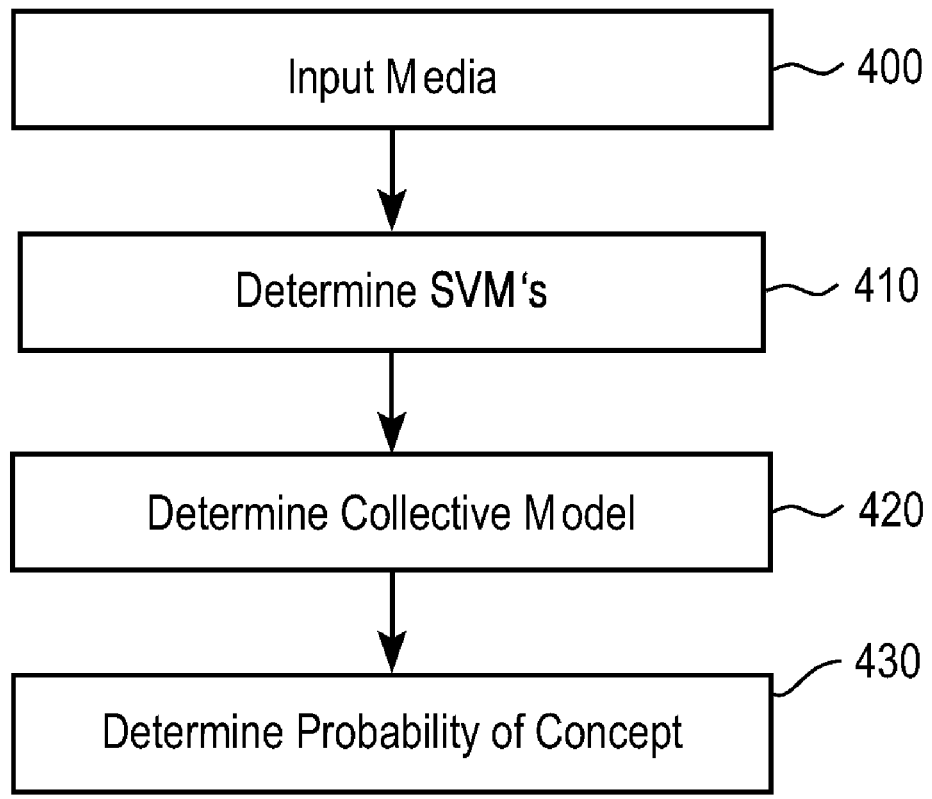
FIG. 4 illustrates a block diagram for testing the semantic analysis invention for detecting trained concepts using media in accordance with the present invention.

As shown in FIG. 4, the trained SVM's, which can be generated in an embodiment of the invention as shown in FIG. 3, are used on a different media set to determine if concepts are present in the media set. The media are input at step 400. Next, the SVM's are applied at step 410. At step 420 the collective annotation model is built. At step 430 the probability that the concept is detected can be determined.

2.3.2 The 'CMLT+1' Model

A second model to capture concept-feature co-occurrence can be defined. First, the low level features X can be quantized across the training set using k-means or any other vector quantization technique. This discrete representation can be denoted for the low-level features as $Q(X) \in \{0, \ldots, Q\}$. For this model, denoted 'CMLT+1', the interaction potentials can be defined by equations (8A)-(8D).

$$f_{ij}^{(q,0)}(Y_i, Y_j, X) = \begin{cases} 1 & Y_i = Y_j = 0, Q(X) = q \\ 0 & \text{otherwise} \end{cases}$$ equation (8A)

$$f_{ij}^{(q,1)}(Y_i, Y_j, X) = \begin{cases} 1 & Y_i = 1, Y_j = 0, Q(X) = q \\ 0 & \text{otherwise} \end{cases}$$ equation (8B)

$$f_{ij}^{(q,2)}(Y_i, Y_j, X) = \begin{cases} 1 & Y_i = 0, Y_j = 1, Q(X) = q \\ 0 & \text{otherwise} \end{cases}$$ equation (8C)

$$f_{ij}^{(q,3)}(Y_i, Y_j, X) = \begin{cases} 1 & Y_i = Y_j = 1, Q(X) = q \\ 0 & \text{otherwise} \end{cases}$$ equation (8D)

The index set for the interaction potentials is $\kappa=\{(i, q): 0 \leq i \leq 3, 0 \leq q \leq Q\}$.

EXAMPLE 1

The TRECVID 2005 development data are used for the high-level concept detection task. The training and test sets each include more than 6000 video shots from various broadcast news sources collected in 2004. the 5 concept graph and 11 concept graph are also used for comparison to the results in R. Yan, M.-Y. Chen, A. Hauptmann, "Mining Relationships Between Concepts using Probabilistic Graphical Models", *Proc. IEEE ICME,* 2006.

5 concept graph: car, face, person, text, walking/running 11 concept graph: building, car, face, maps, outdoor, person, sports, studio, text, urban, walking/running.

For comparison purposes, we outline that the system of Yan et al. (see R. Yan, M.-Y. Chen, A. Hauptmann, "Mining Relationships Between Concepts using Probabilistic Graphical Models", *Proc. IEEE ICME,* 2006) uses the following conditional random field (among several other probabilistic models):

$$P(Y|X) = \frac{1}{Z(X)} \exp\left[\sum_{i \in C}(\alpha_i + V_i^T X)Y_i + \sum_{i \in C}\sum_{j \in N_i} \lambda_{ij} Y_i, Y_j\right] \quad \text{equation (9)}$$

The systems are trained to maximize the likelihood of the training set to fit parameters. The log-likelihood is $$l(D) = \sum_{d \in D}\left[\sum_{i \in C} v_i \log(P_D(Y^{(d)}|X^{(d)})) + \sum_{i \in C}\sum_{j \in N_i}\sum_{k \in K_i} \lambda_{ij}^{(k)} f_{ij}^{(k)}(Y^{(d)}, X^{(d)}) - \log(Z(X^{(d)}))\right] \quad \text{equation (10)}$$

This gives the gradient equations (11) and (12).

$$\frac{dl}{dv_i} = \sum_{d \in D}\left[\log(P_D(Y^{(d)}|X^{(d)})) - \sum_{Y_i} \log(P_D(Y_i|X^{(d)}))P(Y_i|X^{(d)})\right] \quad \text{equation (11)}$$

$$\frac{dl}{d\lambda_{ij}^{(k)}} = \sum_{d \in D}\left[f_{ij}^{(k)}(Y_i^{(d)}, Y_j^{(d)}, X^{(d)}) - \sum_{Y_i Y_j} f_{ij}^{(k)}(Y_i^{(d)}, Y_j^{(d)}, X^{(d)})P(Y_i, Y_j|X^{(d)})\right] \quad \text{equation (12)}$$

Here $Y^{(d)}$ denoted the ground truth for training sample $X^{(d)}$. Also, $Y_i^{(d)}, Y_j^{(d)}$ denote the true values for concepts i, j∈C for sample $X^{(d)}$ while Yi, Yj denote binary variables of integration. As demonstrated in (R. Malouf, "A comparison of algorithms for maximum entropy parameter estimation", *Proceeding of the 6th Conference on Natural Language Learning—Volume* 20 *International Conference On Computational Linguistics*. Association for Computational Linguistics, Morristown, N.J., 1-7, 2002) limited memory conjugate gradient methods greatly accelerate training maximum entropy and log-linear classifiers. The Broyden-Fletcher-Goldfarb-Shanno (BFGS) minimization routine can be used for maximum likelihood model training.

Exhaustive inference can also be used, which entails evaluating P(Y|X) for each observed Y, and marginalizing to compute $P(X_i|X)$ 'for all' i∈C. This is generally prohibitive due to the exponential growth in concept combinations with the number of concepts. In the present context, the number of observed combination is much smaller. For example, fewer than 200 combinations in the experiments are observed using the 11 concept graph (as opposed to 2048 possible combinations).

Figure 2A:
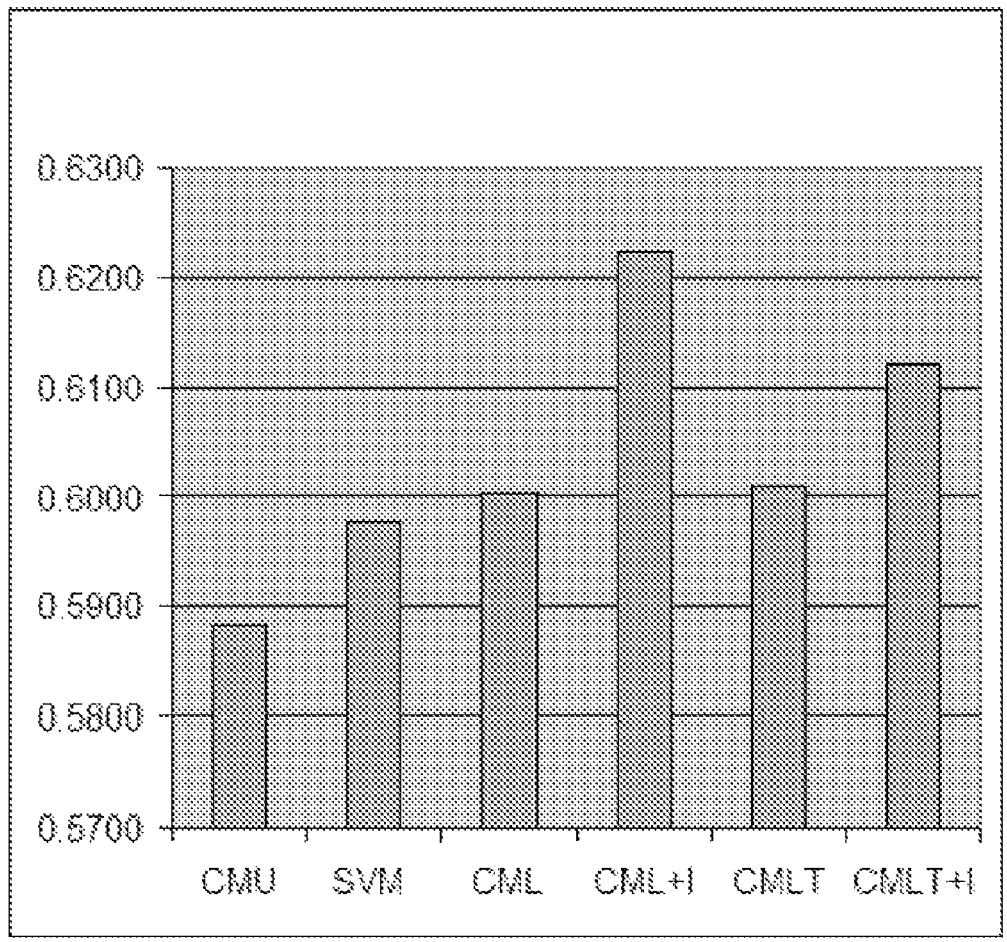
FIG. 2A shows experimental results comparing various system variants for the '5 concept' graph.
Figure 2B:
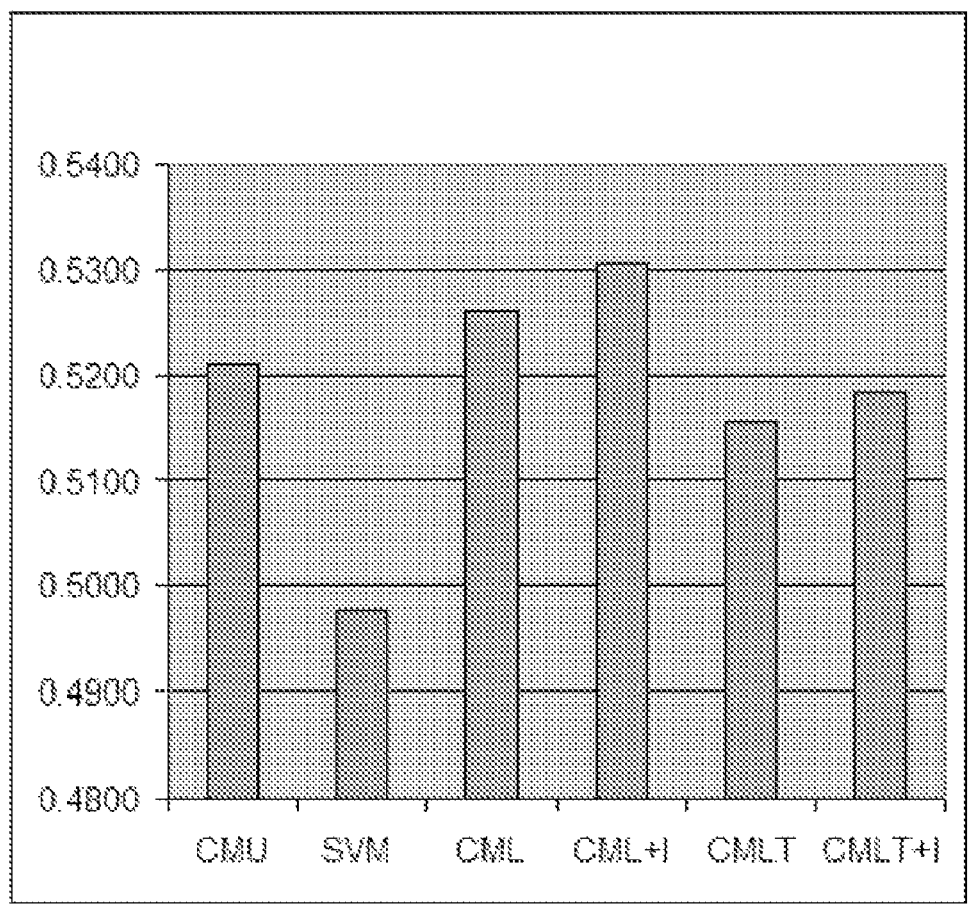
FIG. 2B shows experimental results comparing various system variants for the '11 concept' graph.

The first experimental baseline, denoted 'CMU', shows the results using equation (9) (R. Yan, M.-Y. Chen, A. Hauptmann, "Mining Relationships Between Concepts using Probabilistic Graphical Models", *Proc. IEEE ICME,* 2006). The second experimental baseline, denoted 'SVM', shows the results of using the discriminative 'SVM' outputs for independent concept detection (C. Snoek, M. Worring, J. van Gemert, J.-M. Geusebroek, and A. Smeulders, "The Challenge Problem for Automated Detection of 101 Semantic Concepts in Multimedia", *Proceedings of ACM Multimedia,* 2006). The experimental results for the '5 concepts' graph are summarized in FIG. 2A. The experimental results for the '11 concept' graph are summarized in FIG. 2B. The performance measure is mean average precision (MAP) which averages precision at each level of recall for each concept, and then computes the mean (of the average precisions) over the set of concepts.

To isolate the contributions of the discriminative per-label classifiers, the interaction potential of equation (13) can be used in the 'CMU' system, to build the 'CML' system with equation (4).

$$f_{ij}(Y_i, Y_j, X) = \begin{cases} 1 & Y_i = Y_j = 1 \\ 0 & \text{otherwise} \end{cases} \quad \text{equation (13)}$$

For this case there is a single feature for each stage (Yi, Yj), and the summation over k degenerates to a single term. The 'CML' system (0.6002) does slightly better than 'SVM' system (0.5977) and the 'CMU' system (0.5882) for the 5 concept graph. It also outperforms both systems on the 11 concept graph ('CMU'=0.5211, 'SVM'=0.4975, 'CML'=0.5262).

Next, the more complete indexed family of interaction potential functions is given by equations (7A)-(7D) to equation (4) to form the system denoted 'CML+1'. This system accounts for different types of inter-concept relationships and performs at the highest level of all systems in both cases with MAP of 0.6233 and 0.5307 for the '5 concept' and '11 concept' graphs, respectively.

The final systems test the value of the concept-feature co-occurrence interaction potentials. The 'CMLT' model combines the discriminative association potentials with simple interaction (analogous to CML):

$$f_{ij}^{(q)}(Y_i, Y_j, X) = \begin{cases} 1 & Y_i = Y_j = 1, Q(X) = q \\ 0 & \text{otherwise} \end{cases} \quad \text{equation (14)}$$

This system outperforms the SVM baseline for both graphs, but the CMU baseline does better for the 11 concept graph. The 'CMLT' system has MAP of 0.6009 and 0.5136 for the 5 and 11 concept graphs, respectively. The 'CMLT+1' system uses the more complete interaction potential functions of (8). This system outperforms 'CMLT', but in both cases is worse than 'CML+1'. The 'CMLT+1' system has MAP of 0.6122 and 0.5184 for the 5 and 11 concept graphs, respectively. This can be due to the coarse quantization and relatively uninformative low-level features used (k-means to 126 classes), and expect that more sophisticated quantization will yield further improvements.

Example embodiments of the methods, systems, and components of the present invention have been described herein. As noted elsewhere, these example embodiments have been described for illustrative purposes only, are not limiting.

Other embodiments are possible and are covered by the invention. Such embodiments will be apparent to persons skilled in the relevant art(s) based on the teachings contained herein.

Thus, the breadth and scope of the present invention should not be limited by any of the above-described exemplary embodiments, but should be defined only in accordance with the following claims and their equivalents.

In an embodiment of the invention, a method for detecting one or more concept in multimedia comprises extracting low level features representative of the one or more concept and training a discriminative classifier for each concept using a set of the low level features. A collective annotation model can be built by combining each of the discriminative classifiers, defining one or more interaction potential to model interdependence between related concepts, detecting the presence/absence of one or more concepts based on the collective annotation model and the defined interaction potentials and supplying one or both of a confidence measure and a ranking associated with the identified concepts, wherein one or both of the confidence measure and the ranking can vary with time In an embodiment of the invention, a method for detecting one or more concept in multimedia comprises extracting low level features representative of the one or more concept and training a discriminative classifier for each concept using a set of the low level features. A collective annotation model can be built by combining each of the discriminative classifiers, defining one or more interaction potential to model interdependence between related concepts, detecting the presence/absence of one or more concept based on the collective annotation model and the defined interaction potentials and leveraging Pre-trained concept detectors to improve detection of concepts.

In an embodiment of the invention, a method for detecting one or more concept in multimedia comprises extracting low level features representative of the one or more concept and training a discriminative classifier for each concept using a set of the low level features. A collective annotation model can be built by combining each of the discriminative classifiers, defining one or more interaction potential to model interdependence between related concepts, detecting the presence/absence of one or more concepts based on the collective annotation model and the defined interaction potentials and employing approximate inference strategies to improve detection of concepts.

In an embodiment of the invention, a method for detecting one or more concept in multimedia comprises extracting low level features representative of the one or more concept and training a discriminative classifier for each concept using a set of the low level features A collective annotation model can be built by combining each of the discriminative classifiers, defining one or more interaction potential to model interdependence between related concepts, detecting the presence/absence of one or more concepts based on the collective annotation model and the defined interaction potentials and quantization of the low level features during the training.

In an embodiment of the invention, a system to identify one or more concepts in digital media comprises a processing component for extracting low level features representative of one or more concepts. A processing component for training a discriminative classifier for each concept using a set of the low level features. A processing component capable of building a collective annotation model based on each of the discriminative classifiers and one or more defined interaction potentials to identify related concepts. The system further comprises a processing component capable of identifying one or more concepts based on the collective annotation model and the defined interaction potentials.

In an embodiment of the invention, a machine readable medium has instructions stored thereon that when executed by a processor cause a system to extract low level features representative of the one or more concept. The machine readable medium also has instructions to train a discriminative classifier for each concept using a set of the low level features. The machine readable medium also has instructions to build a collective annotation model based on each of the discriminative classifiers. The machine readable medium also has instructions to define one or more interaction potential to identify related concepts and identify one or more concepts based on the collective annotation model and the defined interaction potentials.

What is claimed is:

1. A method for detecting two or more concepts in a source digital video which includes one or more digital video frames comprising:
    (a) segmenting the source digital video into a plurality of shots, wherein each shot includes one or more of the digital video frames;
    (b) identifying a keyframe within each shot, wherein the keyframe is one of the one or more of the digital video frames;
    (c) extracting low level features from the keyframe, wherein the low level features are representative of the two or more concepts, and are related in a graph of concepts, and wherein each concept is semi-automatically generated text associated with the one or more digital video frames, and wherein semi-automatically generated text is automatically generated text which has been manually revised;
    (d) training a discriminative classifier for each concept using a set of the low level features, wherein the discriminative classifier is a support vector machine;
    (e) building a collective annotation model combining each of the discriminative classifiers;
    (f) defining in the collective annotation model one or more interaction potential to model interdependence between related concepts;
    (g) receiving a second source digital video;
    (h) applying the discriminative classifiers to the second source digital video; and
    (i) determining a probability of a presence or absence of the two or more concepts in the low level features extracted from the second source digital video using the collective annotation model and the defined interaction potentials.

2. The method of claim 1, wherein the one or more digital video frames further includes one or more forms of data selected from the group consisting of aligned digital text, tag information, text transcripts and web page links.

3. The method of claim 1, wherein the set of low level features are selected from the group consisting of color histograms, texture features, edge features, motion analysis, face detection and aligned text data.

4. The method of claim 1, wherein the output of the support vector machine is transformed to a probability using a logistic mapping.

5. The method of claim 1, wherein the collective annotation model is selected from the group consisting of discriminative random field (DRF) model, conditional random filed (CMU) model, discriminative output independent concept detection (SVM) model, inter concept co-occurrence (CML+I) model and concept feature co-occurrence (CMLT+I) model.

6. The method of claim 1, wherein the defined interaction potential is a function of each pair of concepts $Y_i$, $Y_j$.

7. The method of claim 6, wherein the defined interaction potential distinguishes all four binary combinations of Yi and Yj.

8. The method of claim 1, wherein the defined interaction potential is a function of each pair of concepts Yi, Yj and low level feature data.

9. The method of claim 1, wherein a discriminative classifier applies to a single concept, wherein a set of discriminative classifiers applies to a set of concepts.

10. The method of claim 9, wherein the set of discriminative classifiers is integrated in a framework for collective multimedia annotation.

11. The method of claim 1, further comprising supplying one or both of a confidence measure and a ranking associated with the identified concepts.

12. The method of claim 11, wherein one or both of the confidence measure and the ranking can vary with time of the one or more digital video frames.

13. The method of claim 11, wherein one or both of the confidence measure and the ranking can be used for recommending an annotation to a user in the form of a ranked list.

14. The method of claim 1, further comprising using a discriminative classifier trained for each concept using a labeled training set of low-level features to improve detection of concepts.

15. The method of claim 1, further comprising evaluating the probability $P(Y_i|X)$ for each low level feature ($Y_i$), where $i \in C$, where C represents all observed concept combinations for the training sample X to improve detection of concepts.

16. The method of claim 1, further comprising quantization of the low level features during the training, such that each low level feature ($Y_i$) belongs to the set 0, 1.

17. A system to identify two or more concepts in digital media comprising:
- a computer including a processing component for extracting low level features representative of the two or more concepts from a source digital video, wherein each concept is semi-automatically generated text associated with one or more digital video frames of the source digital video, and wherein semi-automatically generated text is automatically generated text which has been manually revised;
- a processing component for training a discriminative classifier for each concept using a set of the low level features, wherein the discriminative classifier is a support vector machine, and wherein the two or more concepts are related in a graph of concepts;
- a processing component capable of building a collective annotation model based on each of the discriminative classifiers;
- one or more defined interaction potential defined in the collective annotation model used to model interdependence between related concepts; and
- a processing component capable of identifying a probability of a presence or absence of the two or more concepts in the low level features extracted from a second source digital video using the collective annotation model and the defined interaction potentials.

18. A non-transitory machine readable medium having instructions stored thereon that when executed by a processor cause a system to:
- segment the source digital video into a plurality of shots, wherein each shot includes one or more of the digital video frames;
- identify a keyframe within each shot, wherein the keyframe is one of the one or more of the digital video frames;
- extract low level features representative of the two or more concepts, wherein the low level features are representative of the two or more concepts, and are related in a graph of concepts, and wherein each concept is semi-automatically generated text associated with one or more digital video frames, and wherein semi-automatically generated text is automatically generated text which has been manually revised;
- train a discriminative classifier for each concept using a set of the low level features, wherein the discriminative classifier is a support vector machine;
- build a collective annotation model based on each of the discriminative classifiers;
- define in the collective annotation model one or more interaction potential to identify related concepts;
- receive a second source digital video;
- apply the discriminative classifiers to the second source digital video; and
- determine a probability of a presence or absence or absence of the two or more concepts in the low level features extracted from the second source digital video using the collective annotation model and the defined interaction potentials.

19. The method of claim 1 wherein the defined interaction potential is a function of each pair of related concepts Yi, Yj, wherein each pair of related concepts is connected by an edge in the graph of concepts, and wherein a total number of pairs of related concepts is less than a total number of pairs of concepts.

* * * * *